UNITED STATES PATENT OFFICE.

LEWIS E. SAUNDERS AND RAY HILL WHITE, OF NIAGARA FALLS, NEW YORK, ASSIGNORS TO NORTON COMPANY, OF WORCESTER, MASSACHUSETTS, A CORPORATION OF MASSACHUSETTS.

PREPARING ALUMINOUS ABRASIVES.

1,269,222.     Specification of Letters Patent.     Patented June 11, 1918.

No Drawing.     Application filed August 18, 1917. Serial No. 186,919.

*To all whom it may concern:*

Be it known that we, LEWIS E. SAUNDERS and RAY HILL WHITE, citizens of the United States, residing at Niagara Falls, in the county of Niagara and State of New York, have invented certain new and useful Improvements in Preparing Aluminous Abrasives, of which the following is a specification.

It is known that an appreciable reduction of alumina is apt to occur when calcined bauxite or other aluminous raw material is subjected to electric furnace fusion in presence of carbon, whether the carbon is present in the form of electrodes, or is mixed with the charge for the purpose of bringing about the reduction and elimination of the usual impurities of bauxite, such as the oxids of iron, silicon and titanium. The reduction products of alumina thus formed (among which may be mentioned aluminum carbid and the hypothetical suboxid of aluminum) are highly objectionable constituents of the product, tending to its disintegration in presence of moisture. The tendency to the formation of these reduction products is more pronounced as the alumina is of higher purity, inasmuch as the oxids of iron and silicon are more easily reducible than alumina, and thereby serve to prevent reduction of alumina so long as they are present in the charge in substantial excess of the carbon available for the reduction. We have found that the formation of these reduction products of alumina may be prevented by incorporating with the aluminous material to be fused an appropriate amount of an oxidizing addition which yields volatile reaction products. This presents the important advantage, as compared with a similar use of iron oxid or the like, that the reaction products do not remain in or associated with the fused alumina, but are driven off, for the most part at least, during the furnacing operation.

As such oxidizing additions, we may use oxygen-compounds of sodium or zinc, as for example soda-ash, anhydrous sodium sulfate, zinc oxid or the like. The quantity to be used is of course dependent upon the amount of carbon present, or upon the carbon surfaces presented to the charge. Under usual operating conditions, however, from one to five per cent of such additions will suffice to prevent the occurrence in the fused product of the objectionable reduction products of alumina, while at the same time the oxidizing additions themselves disappear in the course of the furnacing operation, either wholly or to such extent as to leave no residual impurities of an objectionable nature in the fused product.

Nevertheless, other effects due to the use of these oxidizing additions are at times observed. For example, in the case of sodium compounds there is a marked weakening of the abrasive grain, whether the addition is made to substantially pure alumina as disclosed in our copending application Serial No. 184,110, filed Aug. 2, 1917, or to ordinary bauxite as disclosed in our copending application Serial No. 184,111, filed Aug. 2, 1917. According to the present invention, however, the primary purpose of the oxidizing addition is to avoid reduction of alumina, whether supplied in a state of substantial purity or in the form of bauxite, by the action of the carbon electrodes or furnace hearth or of carbon mixed with the charge for the purpose of reducing the impurities present: and for this purpose, any oxidizing addition whereof the reduction products are volatile at the operating temperatures is regarded as equivalent to the oxygen compounds of sodium.

The proportion of the oxidizing addition will of course vary considerably in accordance with the amount of carbon in the charge or exposed to the charge, a due allowance being made in the case of such impure materials as bauxite for the presence therein as normal impurities of such oxidizing bodies as the oxids of iron, silicon and titanium.

We claim:—

1. In the art of preparing aluminous abrasives by the electric furnace fusion of aluminous materials in presence of carbon, the method of preventing reduction of alumina, which consists in adding to the charge to be fused a relatively small proportion of an oxygen-containing substance of which the reduction products are volatile under the furnacing conditions.

2. In the art of preparing aluminous abrasives by the electric furnace fusion of aluminous materials in presence of carbon, the method of preventing reduction of alumina, which consists in adding to the charge to be fused a relatively small proportion of an oxygen-compound of a volatile metal.

3. In the art of preparing aluminous abrasives by the electric furnace fusion of aluminous materials in presence of carbon, the method of preventing reduction of alumina, which consists in adding to the charge a relatively small proportion of an oxygen-compound of zinc.

In testimony wherof, we affix our signatures.

LEWIS E. SAUNDERS.
RAY HILL WHITE.